United States Patent
Aoyama et al.

(10) Patent No.: US 9,287,051 B2
(45) Date of Patent: Mar. 15, 2016

(54) ELECTROLYTIC CAPACITOR AND METHOD FOR MANUFACTURING SAME

(75) Inventors: Tatsuji Aoyama, Kyoto (JP); Yuuki Murata, Yamaguchi (JP); Hiroyuki Matsuura, Shiga (JP); Hidehiro Sasaki, Toyama (JP); Kazuyo Saito, Osaka (JP); Yukiya Shimoyama, Yamaguchi (JP); Jyunya Kushizaki, Yamaguchi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 279 days.

(21) Appl. No.: 13/976,392

(22) PCT Filed: Feb. 15, 2012

(86) PCT No.: PCT/JP2012/000973
§ 371 (c)(1),
(2), (4) Date: Jun. 26, 2013

(87) PCT Pub. No.: WO2012/111319
PCT Pub. Date: Aug. 23, 2012

(65) Prior Publication Data
US 2013/0279080 A1   Oct. 24, 2013

(30) Foreign Application Priority Data

Feb. 18, 2011  (JP) .................. 2011-032803

(51) Int. Cl.
| | |
|---|---|
| H01G 4/228 | (2006.01) |
| H01G 9/10 | (2006.01) |
| H01G 9/04 | (2006.01) |
| H01G 9/00 | (2006.01) |
| H01G 9/008 | (2006.01) |
| H01G 9/15 | (2006.01) |

(52) U.S. Cl.
CPC ............. *H01G 9/0003* (2013.01); *H01G 9/008* (2013.01); *H01G 9/0029* (2013.01); *H01G 9/04* (2013.01); *H01G 9/15* (2013.01); *Y10T 29/417* (2015.01)

(58) Field of Classification Search
USPC .................................. 361/520, 531; 29/25.03
See application file for complete search history.

(56) References Cited

U.S. PATENT DOCUMENTS

2009/0021893 A1   1/2009   Kakuma et al.
2009/0268378 A1   10/2009   Matsuura et al.

FOREIGN PATENT DOCUMENTS

| JP | 04-307918 | 10/1992 |
|---|---|---|
| JP | 07-094364 | 4/1995 |
| JP | 2008091358 A * | 4/2008 |

(Continued)

OTHER PUBLICATIONS

International Search Report issued in International Application No. PCT/2012/000973 with date of mailing May 22, 2012.

*Primary Examiner* — Eric Thomas
(74) *Attorney, Agent, or Firm* — McDermott Will & Emery LLP

(57) ABSTRACT

A capacitor element includes an anode foil, the first oxide film on a surface of the anode foil, a solid electrolyte layer formed using π-conjugated conductive polymer dispersing material on the first oxide film, and a cathode foil on the solid electrolyte layer. The cathode foil faces the first oxide film across the solid electrolyte layer. An electrolytic capacitor includes the capacitor element, an anode terminal connected to the anode foil, and a second oxide film on a surface of the anode terminal. The second oxide film provided on the anode terminal has higher water repellency than the first oxide film provided on the anode foil. This electrolytic capacitor can reduce a leakage current.

21 Claims, 8 Drawing Sheets

(56) References Cited

FOREIGN PATENT DOCUMENTS

| JP | 2008159941 A | * | 7/2008 |
| JP | 2009-016770 | | 1/2009 |
| JP | 2009-088257 | | 4/2009 |
| JP | 2009-130339 | | 6/2009 |
| JP | 2009-266926 | | 11/2009 |

* cited by examiner

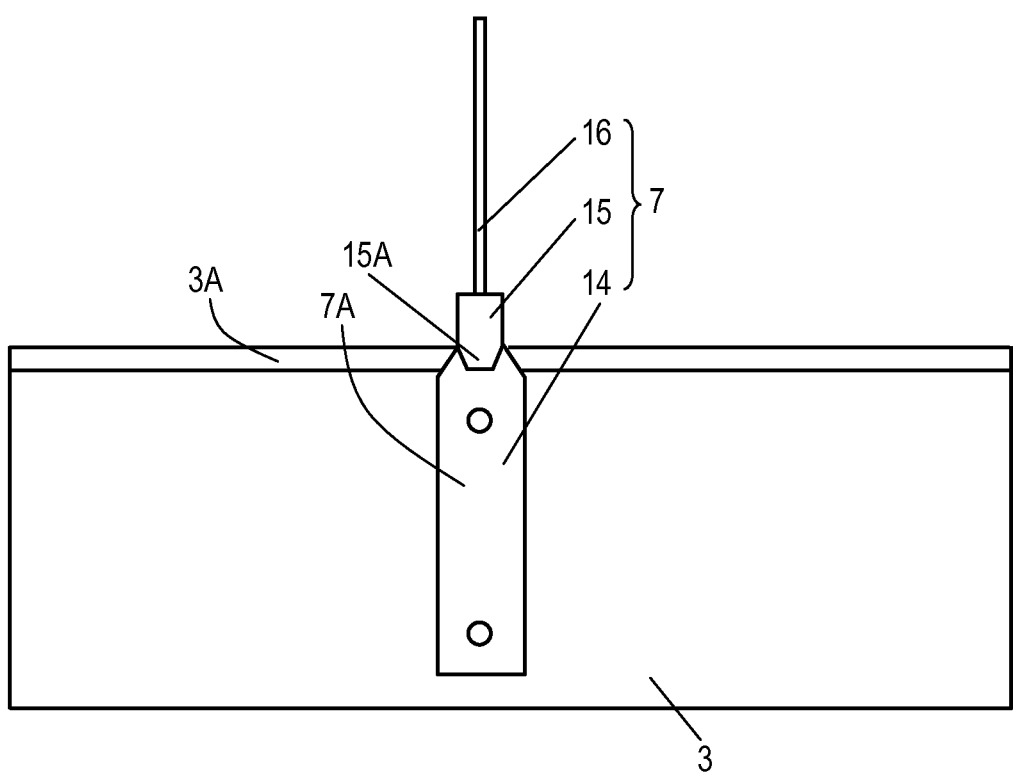

FIG. 7

|  | Condition of Anodizing | | Defective Rate (0.01CV) |
| --- | --- | --- | --- |
|  | Anodizing Solution | Concentration |  |
| Comparative Example 1 | PM | 0.2 wt.% | 15 % |
| Comparative Example 2 | PM | 0.6 wt.% | 13 % |
| Example 1 | AD | 0.2 wt.% | 4 % |
| Example 2 | AD | 0.6 wt.% | 3 % |

ELECTROLYTIC CAPACITOR AND METHOD FOR MANUFACTURING SAME

RELATED APPLICATIONS

This is application is the U.S. National Phase under 35 U.S.C. §371 of International Application No. PCT/JP2012/000973, filed on Feb. 15, 2012, which in turn claims the benefit of Japanese Application No. 2011-032803 filed on Feb. 18, 2011, the disclosures of which Applications are incorporated by reference herein.

TECHNICAL FIELD

The present invention relates to an electrolytic capacitor used for various electronic devices, such as electrical devices, industrial equipment, and, automobile machines, and a method of manufacturing the capacitor.

BACKGROUND ART

As more electronic devices operate at higher frequencies, a capacitor, an electronic component, requires a large capacitance and a superior impedance characteristic at high frequencies. Recently, in order to reduce the impedance at high frequencies, solid electrolytic capacitors have been investigated and produced that use a solid electrolyte, such as conductive polymer having a high electric conductivity. A rolled type solid electrolytic capacitor out of solid electrolytic capacitors with conductive polymer as a solid electrolyte has been produced for satisfying the requirement for a large capacitance due to the structure thereof easily having a larger capacitance than a capacitor having stacked electrode foils. The rolled type solid electrolytic capacitor has a structure including an anode foil and a cathode foil rolled while having a separator between the foils.

A conventional rolled type electrolytic capacitor includes a capacitor element that has an anode foil, a cathode foil, an anode terminal connected to the anode foil, a cathode terminal connected to the cathode foil, and a separator provided between the anode foil and the cathode foil. An oxide film is provided on a surface of the anode foil has by anodizing. The anode foil, the cathode foil, and the separator are rolled. The separator of the capacitor element retains solid electrolyte. The capacitor element is accommodated in a case such that the anode terminal and the cathode terminal are partially exposed to an outside of the case. An opening of this case is sealed with a sealing member.

The oxide film may be damaged while being rolled. The oxide film is formed on a cutting surface of the anode foil and the surface of the anode terminal. Thus, after forming the capacitor element, the second anodizing is preferably performed to restore the oxide film or to newly form an oxide film to subsequently retain the solid electrolyte.

In order to allow the separator to retain the solid electrolyte, the rolled capacitor element is impregnated with dispersion solution containing conductive polymer particles dispersed therein. In this method, the capacitor element is impregnated with conductive polymer particles formed in advance. Thus, this method reduces damage to the oxide film due to oxidant more than a method in which a solid electrolyte layer is formed by oxidation polymerization or chemical polymerization. Furthermore, this method can form a solid electrolyte layer more uniformly on the oxide film than chemical polymerization and oxidation polymerization. Thus, the oxide film can be protected and the damage to the oxide film due to heat for example can be suppressed, thus reducing a leakage current.

Conventional rolled type electrolytic capacitors are disclosed, for example, in Patent Literatures 1 and 2. These conventional rolled type electrolytic capacitors still may cause a large leakage current.

CITATION LIST

Patent Literature

Patent Literature 1: Japanese Patent Laid-Open Publication No. 2009-266926
Patent Literature 2: Japanese Patent Laid-Open Publication No. 2009-16770

SUMMARY OF THE INVENTION

A capacitor element includes an anode foil, the first oxide film on a surface of the anode foil, a solid electrolyte layer formed using π-conjugated conductive polymer dispersing material on the first oxide film, and a cathode foil on the solid electrolyte layer. The cathode foil faces the first oxide film across the solid electrolyte layer. An electrolytic capacitor includes the capacitor element, an anode terminal connected to the anode foil, and a second oxide film on a surface of the anode terminal. The second oxide film provided on the anode terminal has higher water repellency than the first oxide film provided on the anode foil.

This electrolytic capacitor can reduce a leakage current.

BRIEF DESCRIPTION OF THE DRAWINGS

FIG. 3 is a plan view illustrating an anode foil of the electrolytic capacitor in accordance with the embodiment.

FIG. 7 illustrates an evaluation result of the electrolytic capacitor in accordance with the embodiment.

DETAIL DESCRIPTION OF PREFERRED EMBODIMENT

Figure 1:
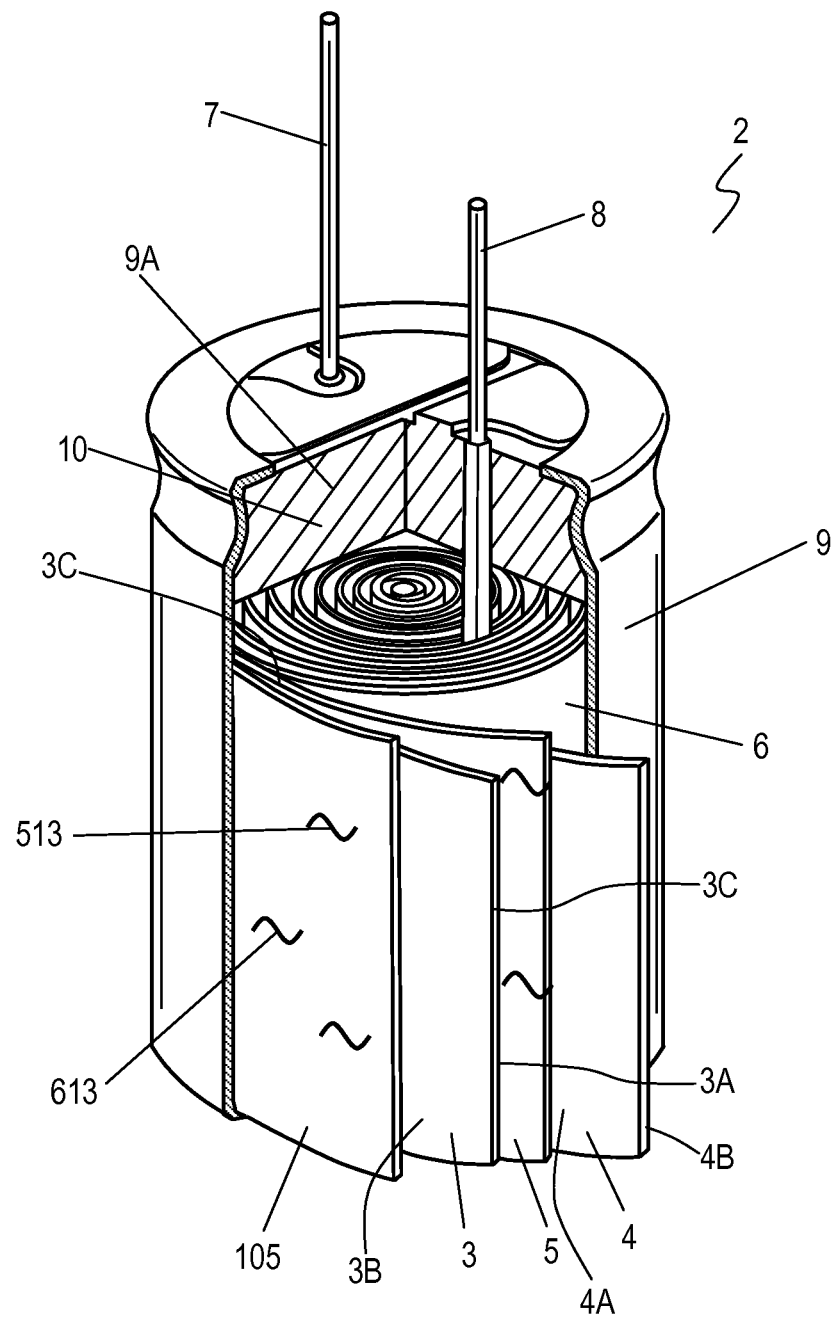
FIG. 1 is a partial cutaway schematic view of an electrolytic capacitor in accordance with an exemplary embodiment of the present invention.

FIG. 1 is a partial cutaway schematic view of electrolytic capacitor 2 in accordance with an exemplary embodiment. According to the embodiment, electrolytic capacitor 2 is a rolled type solid electrolytic capacitor. Electrolytic capacitor 2 has a diameter of 6.3 mm and a height of 5.8 mm, but may have other sizes.

Electrolytic capacitor 2 includes capacitor element 6, anode terminal 7 connected to capacitor element 6, cathode terminal 8 connected to capacitor element 6, case 9 for accommodating capacitor element 6, and sealing member 10 for sealing opening 9A of case 9. Capacitor element 6 includes anode foil 3, cathode foil 4, and separators 5 and 105 provided between anode foil 3 and cathode foil 4. Anode foil 3, cathode foil 4, and separators 5 and 105 are rolled unitarily. Separators 5 and 105 retain solid electrolyte 513. Case 9 accommodates capacitor element 6 therein such that anode terminal 7 and cathode terminal 8 are partially exposed to an outside of case 9. The inside of case 9 may be filled with capacitor element 6 and electrolysis solution 613.

In electrolytic capacitor 2 according to the embodiment, anode foil 3 is made of an aluminum foil having a thickness of about 50 μm and an Al purity not less than 99.99%. Anode foil 3 is not necessarily made of an aluminum foil, but may be made of a valve metal foil, such as a titanium foil. The surface of anode foil 3 may be roughened by etching or vapor deposition. Cathode foil 4 also may be made of a valve metal foil, such as an aluminum or titanium foil. Separators 5 and 105 are made of fiber material, such as cellulose, polyethylene terephthalate, or aramid. Electrolysis solution 613 contains solvent and electrolyte dissolved in the solvent. The solvent may be, for example, γ-butyrolactone, sulfolane, ethylene glycol, or the mixture thereof. Electrolyte may be, for example, organic acid or the salt thereof or inorganic acid or the salt thereof.

According to the embodiment, solid electrolyte 513 is made of polyethylenedioxythiophene dispersing material.

According to the embodiment, the dispersing material is made of polyethylenedioxythiophene dispersed in water. In addition to polyethylenedioxythiophene, organic polymer having a main chain composed of π-conjugated also may be used such as organic polymer, including polypyrroles, polythiophenes, and polyanilines for example. Polypyrroles include, for example, polypyrrole, poly(3-methylpyrrole), and poly(3-ethylpyrrole). Polythiophenes include, for example, polythiophene, poly(3-methylthiophene), and poly(3,4-dimethylthiophene). Polyanilines include, for example, poly(2-methylaniline) and poly(3-sulfanilic acid).

These π-conjugated conductive polymers may include, as a dopant, a compound having alkyl group, carboxy group, sulfo group, alkoxy group, hydroxy group, or cyano group for example to provide high electrical conductivity.

The dispersing material can be manufactured by the following method. First, monomer functioning as a precursor of π-conjugated conductive polymer, dopant, and water are mixed to prepare mixed solution. Next, this mixed solution is mixed with oxidant, such as iron (III) sulfate and the resultant mixture is subjected to chemical polymerization and agitated, thereby preparing a dispersing material.

Figure 2A:
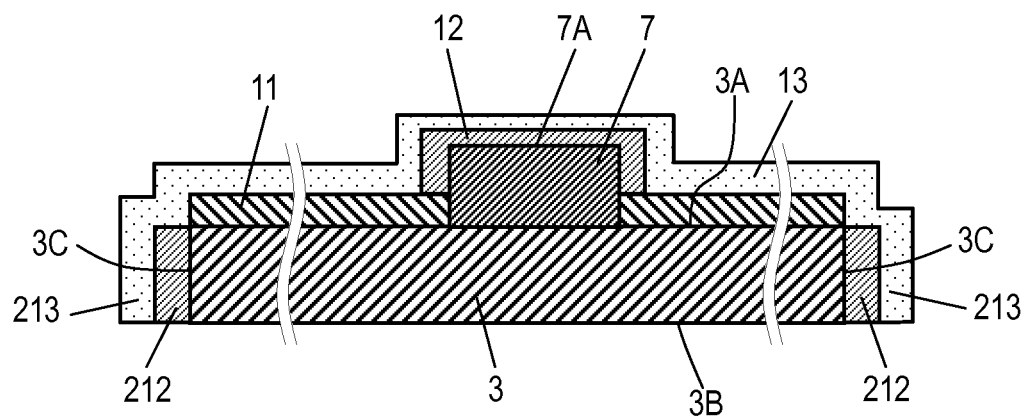
FIG. 2A is a schematic cross-sectional view of a capacitor element of the electrolytic capacitor in accordance with the embodiment.
Figure 2B:
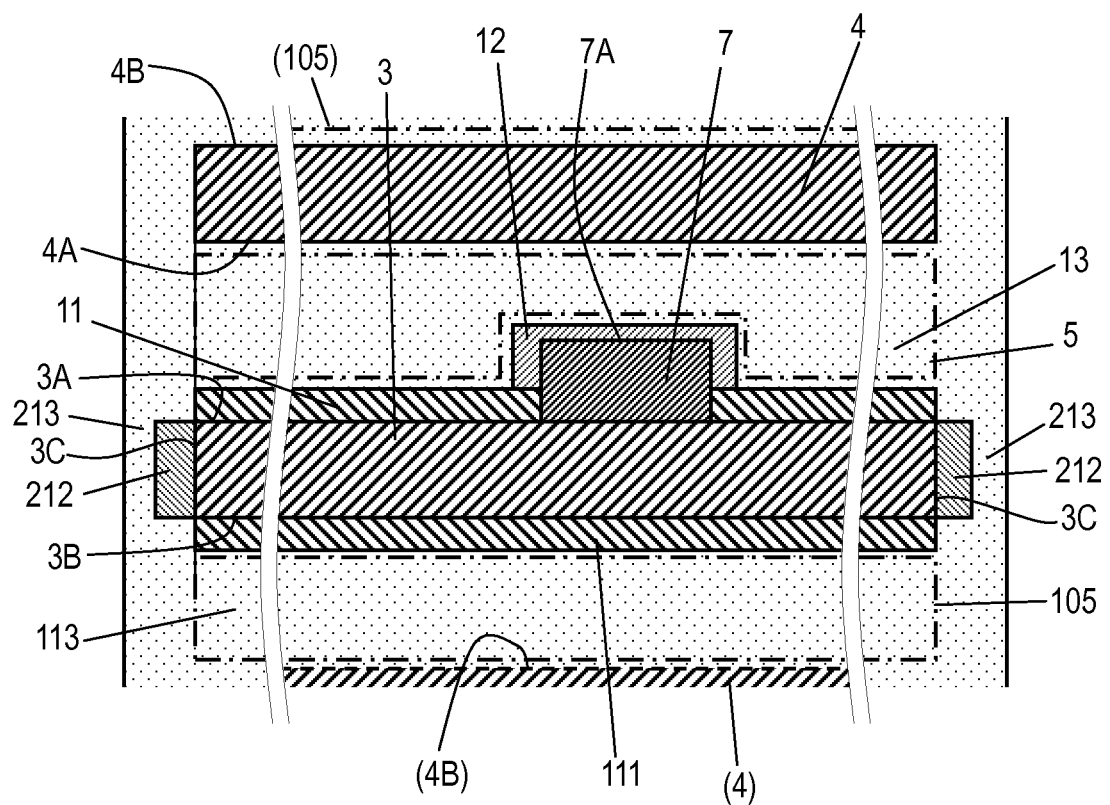
FIG. 2B is a schematic cross-sectional view of the capacitor element of the electrolytic capacitor in accordance with the embodiment.

FIGS. 2A and 2B are schematic cross-sectional views of capacitor element 6. FIG. 2A particularly illustrates the structure of the periphery of anode foil 3. FIG. 2B particularly illustrates the structure of anode foil 3 of capacitor element 6, cathode foil 4, separators 5 and 105, and a solid electrolyte layer formed by rolling. Anode foil 3 has surface 3A, back surface 3B opposite to surface 3A, and side edge surface 3C connected to surface 3A and back surface 3B. Oxide films 11 and 111 containing phosphorus are provided on surface 3A and back surface 3B of anode foil 3, respectively. Anode terminal 7 is connected to surface 3A of anode foil 3. Oxide films 12 and 212 are provided on surface 7A of anode terminal 7 and side edge surface 3C of anode foil 3, respectively. Oxide films 12 and 212 contain phosphorus at a lower percentage per a unit weight than that of oxide film 11. Anode terminal 7 having oxide film 12 thereon contains phosphorus at a lower amount than anode foil 3 having oxide film 11 thereon. Oxide films 12 and 212 have higher water repellency than that of oxide film 11. Anode terminal 7 having oxide film 12 thereon and anode foil 3 having oxide film 11 thereon are measured in contact angles between their surfaces and water. The larger the contact angle is, the higher the water repellency is. Solid electrolyte layer 13 made of solid electrolyte 513 (FIG. 1) is provided on oxide films 11 and 12. Solid electrolyte layers 113 and 213 made of solid electrolyte 513 are provided on oxide films 111 and 212, respectively. Solid electrolyte layers 13, 113, and 213 surround anode terminal 7 and anode foil 3. Separator 5 faces oxide films 11 and 12, and retains solid electrolyte 513 constituting solid electrolyte layer 13. Separator 105 faces oxide film 111, and retains solid electrolyte 513 constituting solid electrolyte layer 113. Cathode foil 4 has: surface 4A and back surface 4B opposite to surface 4A. Surface 4A of cathode foil 4 contacts solid electrolyte layer 13, and faces oxide films 11 and 12 across separator 5 and solid electrolyte layer 13. Anode foil 3, separators 5 and 105, solid electrolyte layers 13 and 113, and cathode foil 4 are rolled unitarily, thereby causing back surface 4B of cathode foil 4 to contact solid electrolyte layer 113, and to face oxide film 111 across solid electrolyte layer 113 and separator 105. Cathode foil 4 is provided on solid electrolyte layer 13, and faces oxide films 11 and 12 across solid electrolyte layer 13.

FIG. 3 is a plan view of anode foil 3 connected to anode terminal 7. Anode terminal 7 includes foil connecting section 14 joined to surface 3A of anode foil 3, intermediate section 15 connoted to foil connecting section 14, and external connecting section 16 extending from intermediate section 15. According to the embodiment, foil connecting section 14 has a flat plate shape. Intermediate section 15 has a round bar shape. External connecting section 16 has a wire shape. These sections may have other shapes. Foil connecting section 14 and intermediate section 15 are made of aluminum having purity not less than 99.99%. External connecting section 16 includes a core wire made of aluminum and a metal layer made of tin or tin/bismuth plating or silver plating provided on the surface of the core wire. According to the embodiment, the round bar is partially pressed and expanded to form foil connecting section 14 having a flat plate shape. Portions of the anode terminal other than the round bar constitute intermediate section 15. The thickness gradually decreases from intermediate section 15 toward foil connecting section 14. Base part 15A of the intermediate section at which intermediate section 15 is connected to foil connecting section 14 has a surface inclining with respect to a longitudinal axis along which anode terminal 7 extends. Intermediate section 15 is welded to external connecting section 16. Foil connecting section 14 of anode terminal 7 is connected to surface 3A of anode foil 3. Intermediate section 15 including base part 15A and external connecting section 16 are arranged to protrude to an outside of anode foil 3.

Oxide film 12 shown in FIGS. 2A and 2B is formed on a portion of anode terminal 7 made of aluminum, i.e., surface 7A of foil connecting section 14 and intermediate section 15.

The cutting surface of anode foil 3, i.e., side edge surface 3C, is covered with oxide film 212.

Figure 4:
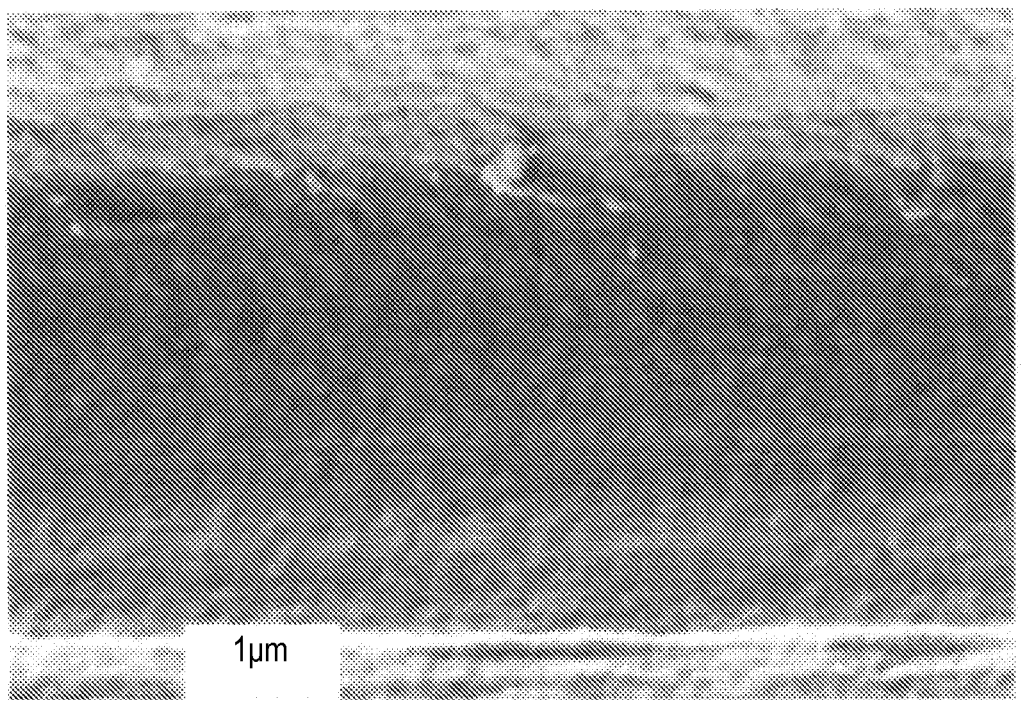
FIG. 4 is a SEM photograph showing a surface of the anode terminal of the electrolytic capacitor in accordance with the embodiment.

FIG. 4 illustrates a photograph of surface 7A of anode terminal 7 captured with a scanning electron microscope (SEM), and shows a part in which oxide film 12 is formed. Oxide film 12 has substantially a flat surface. A contact angle between oxide film 12 and water is 79.5°. Prior to the second anodizing, i.e., prior to the formation of oxide film 12, a contact angle between foil connecting section 14 of anode terminal 7 and water and a contact angle between surface 7A of intermediate section 15 and water are 74.9°. Specifically, anode terminal 7 having oxide film 12 thereon has a contact angle to water increasing from prior to the anodizing, and has a wettability to water decreasing from prior to the anodizing.

Example 1

Figure 5A:
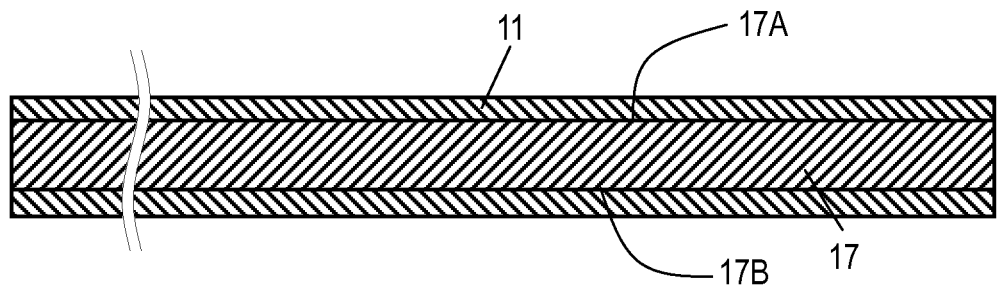
FIG. 5A is a schematic cross-sectional view of the anode foil of the electrolytic capacitor in accordance with the embodiment for illustrating a process for manufacturing the anode foil.
Figure 5B:
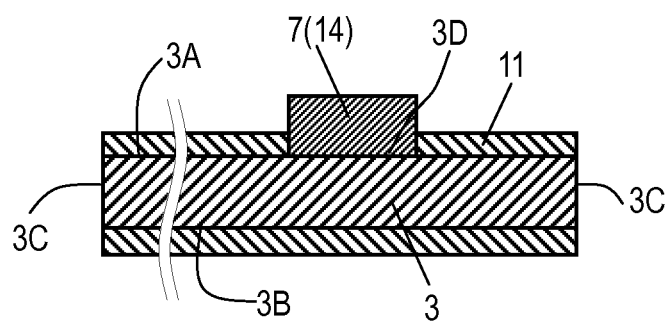
FIG. 5B is a schematic cross-sectional view of the anode foil of the electrolytic capacitor in accordance with the embodiment for illustrating a process for manufacturing the anode foil.
Figure 5C:
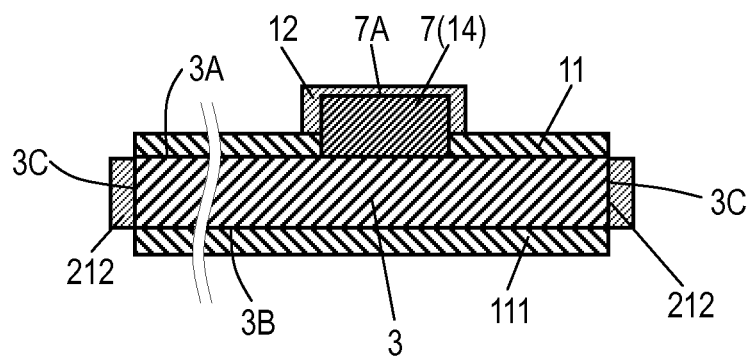
FIG. 5C is a schematic cross-sectional view of the anode foil of the electrolytic capacitor in accordance with the embodiment for illustrating a process for manufacturing the anode foil.

A method of manufacturing Example 1 of electrolytic capacitor 2 according to the embodiment will be described below. FIGS. 5A to 5C are schematic cross-sectional views of anode foil 3 for illustrating process for manufacturing anode foil 3.

As shown in FIG. 5A, valve metal foil 17, such as an aluminum foil, functioning as anode foil 3 is anodized to form oxide film 11 and oxide film 111 on surface 17A and back surface 17B of valve metal foil 17, respectively. Prior to the anodizing, surface 17A and back surface 17B of valve metal foil 17 may be roughened by, e.g. etching or vapor deposition.

In this anodizing, as electrolysis solution functioning as anodizing solution, ammonium phosphate aqueous solution (3.0 wt %) and ammonium adipate aqueous solution (7.0 wt %) are used to anodize valve metal foil 17 with an anodizing voltage of 70V and a temperature of 70° C. for about 30 minutes. The anodizing solution may be made of only ammonium phosphate aqueous solution, and may be aqueous solution of phosphoric salt, such as potassium phosphate salt or sodium phosphate salt, other than ammonium phosphate salt. In Example 1, after the anodizing, valve metal foil 17 was dried at a temperature of 105° C. for 30 minutes. The ammonium phosphate solution may be phosphoric acid-base electrolysis solution, such as diammonium hydrogenphosphate or phosphate monobasic monoammonium. Phosphate monobasic monoammonium aqueous solution is preferable from the viewpoints of characteristic and workability.

Similarly to anode foil 3, cathode foil 4 may have an oxide film formed by anodizing a valve metal foil. The anodizing voltage of cathode foil 4 may be about 2V.

Next, as shown in FIG. 5B, valve metal foil 17 to be used as anode foil 3 is cut to have a predetermined size. Side edge surface 3C of anode foil 3 includes a cutting surface obtained by cutting valve metal foil 17 during the formation of anode foil 3. Oxide films 11 and 111 do not provided on side edge surface 3C of anode foil 3 functioning as the cutting surface. Anode foil 3 and foil connecting section 14 of anode terminal 7 are connected by, e.g. caulking or laser welding. At this moment, as shown in FIG. 5B, oxide film 11 of surface 3A of anode foil 3 may be peeled off to expose portion 3D of surface 3A from oxide film 11 to connect portion 3D to anode terminal 7, thereby reducing the resistance of anode foil 3 and anode terminal 7. Cathode foil 4 may be similarly obtained by cutting a valve metal foil to have a predetermined size to connect cathode foil 4 to the foil connecting section of cathode terminal 8 by, e.g. caulking or laser welding. As a result, anode foil 3 and cathode foil 4 can be drawn from capacitor element 6 with anode terminal 7 and cathode terminal 8, respectively.

Then, as shown in FIG. 2B, anode foil 3, cathode foil 4, and separators 5 and 105 are stacked and rolled unitarily such that separator 105 is situated on back surface 3B of anode foil 3, and that separator 5 is places between surface 3A of anode foil 3 and surface 4A of cathode foil 4, thereby providing capacitor element 6.

Next, capacitor element 6 is re-anodized to restore a missing part of oxide film 11 caused by winding. In this re-anodizing, 0.2 wt %-ammonium adipate aqueous solution is used as electrolysis solution functioning as the anodizing solution. Capacitor element 6 is impregnated with this solution to be re-anodized at an anodizing voltage of 65V and a temperature of 70° C. for a few minutes, thereby having a missing portion of oxide film 11 restored. This re-anodizing, as shown in FIG. 5C, forms oxide film 212 on side edge surface 3C of anode foil 3, and simultaneously, forms oxide film 12 on foil connecting section 14 of anode terminal 7 and surface 7A of intermediate section 15.

In Example 1, oxide film 12 is provided on the entire surface of intermediate section 15. Oxide film 12 may be formed at least in a region in which solid electrolyte layer 13 is stacked. Thus, oxide film 12 may be provided on at least foil connecting section 14 joined to anode foil 3 while oxide film 212 may be provided on side edge surface 3C of anode foil 3. Oxide film 12 may not necessarily be provided on intermediate section 15. However, oxide film 12 may be preferably provided on base part 15A to isolate solid electrolyte layer 13 and electrolysis solution 617 (see FIG. 1).

In Example 1, in the re-anodizing, phosphoric salt solution is not used as electrolysis solution functioning as the anodizing solution. Thus, oxide film 12 contains substantially no phosphorus. In Example 1, oxide film 11 contains 6 ppm or more phosphorus while phosphorus is contained in oxide films 12 and 212 as impurity only at a concentration lower than about 1 ppm. The anodizing solution for the re-anodizing may be adipate aqueous solution, such as potassium adipate aqueous solution or sodium adipate aqueous solution, borate aqueous solution, such as boric acid aqueous solution, ammonium borate aqueous solution, or sodium borate aqueous solution, or electrolysis solution including at least one of them, other than ammonium adipate aqueous solution.

In the re-anodizing, the adipate aqueous solution used as chemical conversion coating solution has a high pH cushioning characteristic. Thus, foil connecting section 14 of anode terminal 7 and surface 7A of intermediate section 15 are prevented from having a hole therein. As shown in the SEM photograph of FIG. 4, surface 7A is smooth. Surface 7A of anode terminal 7 may have a small hole therein. Thus, the hole has an opening diameter having a mode value smaller than 10 nm.

After the re-anodizing is performed to form oxide films 12 and 212, separators 5 and 105 of capacitor element 6 retain solid electrolyte 513 made of conductive polymer. Then, as shown in FIG. 2B, solid electrolyte layer 13 is formed on oxide films 11 and 12, solid electrolyte layer 113 is formed on oxide film 111, and solid electrolyte layer 213 is formed on oxide film 212. Solid electrolyte layers 13, 113, and 213 cover anode foil 3 and anode terminal 7 having thereon oxide films 11, 12, and 212. Specifically, the surface of oxide film 11 formed on surface 3A of anode foil 3 facing separator 5, the surface of oxide film 111 formed on back surface 3B of anode foil 3 facing separator 105, surface 7A of foil connecting section 14 of anode terminal 7, and the surface of oxide film 212 formed on side edge surface 3C of anode foil 3 are impregnated with dispersion solution to form solid electrolyte layers 13, 113, and 213.

Figure 6:
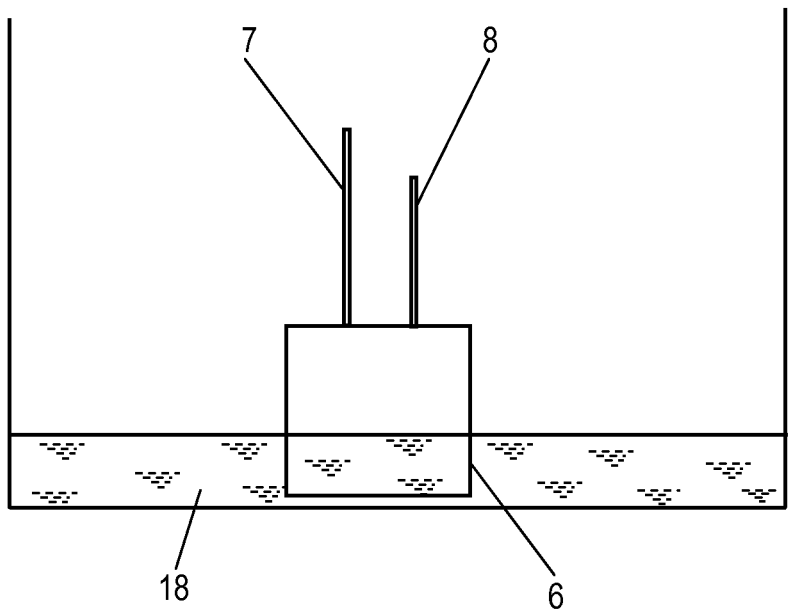
FIG. 6 illustrates a process for manufacturing the electrolytic capacitor in accordance with the embodiment.

FIG. 6 illustrates a process for manufacturing Example 1 of electrolytic capacitor 2. In this process, one end of capacitor element 6 is impregnated with dispersion solution 18 containing water and conductive polymer dispersed in the water. Dispersion solution 18 moves by capillary phenomena from the one end of capacitor element 6 to the other end to fill the entirety of capacitor element 6.

As this conductive polymer, ethylene dioxythiophene is employed that has high conductivity and a high withstand voltage. As a dopant, a polyethylenedioxythiophene (PEDOT) dispersing material using polystyrenesulfonic (PSS) acid is used.

In Example 1, a PEDOT dispersing material having a particle diameter having a mode value of 50 nm and electric conductivity of 200 S/cm is dispersed in a dispersion medium to obtain 2.0 wt %-dispersion solution 18. The particle diameter can be measured by dynamic light scattering. The mode value of the particle diameter is a mode diameter and is a peak value of the particle size distribution obtained by plotting the particle diameter on the horizontal axis and the particle number on the vertical axis.

In order to sufficiently fill the inside of capacitor element 6 with dispersion solution 18, capacitor element 6 is preferably impregnated with dispersion solution 18 in a vacuum atmosphere not higher than −90 kPa.

In Example 1, oxide film 12 having higher water repellency than that of oxide film 11 is provided on the surface of base part 15A of intermediate section 15. Thus, even when capacitor element 6 is impregnated with dispersion solution 18, oxide film 12 can suppress dispersion solution 18 from moving up from base part 15A toward external connecting section 16. This can consequently suppress the contact between a part having no oxide film 12 (external connecting section 16 in the embodiment) and dispersion solution 18. Furthermore, the dispersing material is made of particles having particle diameters having a mode value of 50 nm. The holes formed in intermediate section 15 and foil connecting section 14 have opening diameters smaller than that of the dispersing material, thus suppressing the particles from being captured in the holes.

Furthermore, oxide film 212 having higher water repellency than that of oxide film 11 is provided on side edge surface 3C of anode foil 3. Thus, side edge surface 3C of anode foil 3 is suppressed from being impregnated with dispersion solution 18 than surface 3A. The amount of solid electrolyte 513 in solid electrolyte layer 213 is smaller than that of solid electrolyte layers 13 and 113. Generally, an electric field tends to concentrate on a side edge surface of an electrode foil. The side edge surface tends to receive a pressure from the up-and-down direction during the sealing of case 9. As a result, the side edge surface has a withstand voltage lower than that of the surface and the back surface. In Example 1, oxide film 212 having high water repellency is provided on side edge surface 3C, and hence, prevents solid electrolyte layer 213 from being formed on side edge surface 3C, hence reducing a leakage current, and having a high withstand voltage.

Next, capacitor element 6 impregnated with dispersion solution 18 is heated at a temperature ranging from 100 to 150° C. for about 60 minutes to remove the solvent. The particles of the conductive polymer of the PEDOT dispersing material aggregate to allow separators 5 and 105, anode foil 3, and cathode foil 4 to retain solid electrolyte 513. As a result, solid electrolyte layers 13, 113, and 213 made of polyethylenedioxythiophene is provided on oxide films 11, 12, 111, and 212.

Capacitor element 6 retaining solid electrolyte 513 may be further impregnated with electrolysis solution 613. Electrolysis solution 613 which used for the electrolytic capacitor using a combination of electrolysis solution 613 and solid electrolyte 513 made of conductive polymer is preferably made of polyethylene glycol (PEG)-base solvent since polyethylene glycol (PEG)-base solvent has a high boiling point and is hard to dry up due to its low volatility. Electrolysis solution 613 can continuously restore oxide films 11 and 111 for a long time and prevents short circuiting for a long time. Next, external connecting section 16 of anode terminal 7 extending from capacitor element 6 and the external connecting section of cathode terminal 8 are inserted to apertures provided in sealing member 10. Capacitor element 6 and sealing member 10 are inserted to case 9 through opening 9A. Then, the outer edge of opening 9A of case 9 is shrunk. An opening end of opening 9A of case 9 is sealed by a carling processing, thereby assembling electrolytic capacitor 2 of Example 1.

Finally, an aging process is performed to electrolytic capacitor 2 in which a rated voltage is applied to assembled electrolytic capacitor 2 at a temperature of 105° C. for 60 minutes, thereby completing electrolytic capacitor 2.

In the case that electrolysis solution 613 is not used as electrolyte, the process for the impregnation of electrolysis solution 613 is omitted. Thus, capacitor element 6 retains solid electrolyte 513, and then is accommodated and sealed in case 9.

Example 2

Electrolytic capacitor 2 of Example 2 is different from Example 1 in that ammonium adipate salt used as electrolysis solution functioning as the anodizing in the re-anodizing has a concentration of 0.6 wt %. In Example 2, phosphorus contained in oxide films 12 and 212 at a concentration lower than 1 ppm that is substantially the same as Example 1. Foil connecting section 14 and intermediate section 15 of anode terminal 7 have substantially no hole therein, thus being smooth similarly to Example 1. The other manufacture methods are the same as those of Example 1.

Comparative Example 1

In Comparative Example 1, the anodizing solution for the re-anodizing is 0.2 wt %-ammonium phosphate aqueous solution instead of ammonium adipate aqueous solution. Oxide films formed on the surface of the foil connecting section and the intermediate section of the anode terminal contains phosphorus at about 6 ppm. The surface has a contact angle of 46.4° to water.

FIG. 7 illustrates a SEM photograph of the surface of the anode terminal of the electrolytic capacitor of Comparative Example 1 at a magnification of 30,000. The surfaces of the foil connecting section and the intermediate section has a lot of holes 1 formed therein. Holes 1 have opening diameters having a mode value not smaller than 100 nm. The other parts are the same as those of Example 1.

Comparative Example 2

In Comparative Example 2, the anodizing solution for the re-anodizing is 0.6 wt %-ammonium phosphate aqueous solution instead of ammonium adipate aqueous solution. The oxide film formed on the surface of the anode terminal contains phosphorus at about 13 ppm. The surfaces of the foil connecting section and the intermediate section include a lot of holes therein. The other parts are the same as those of Example 1.

Figure 8:
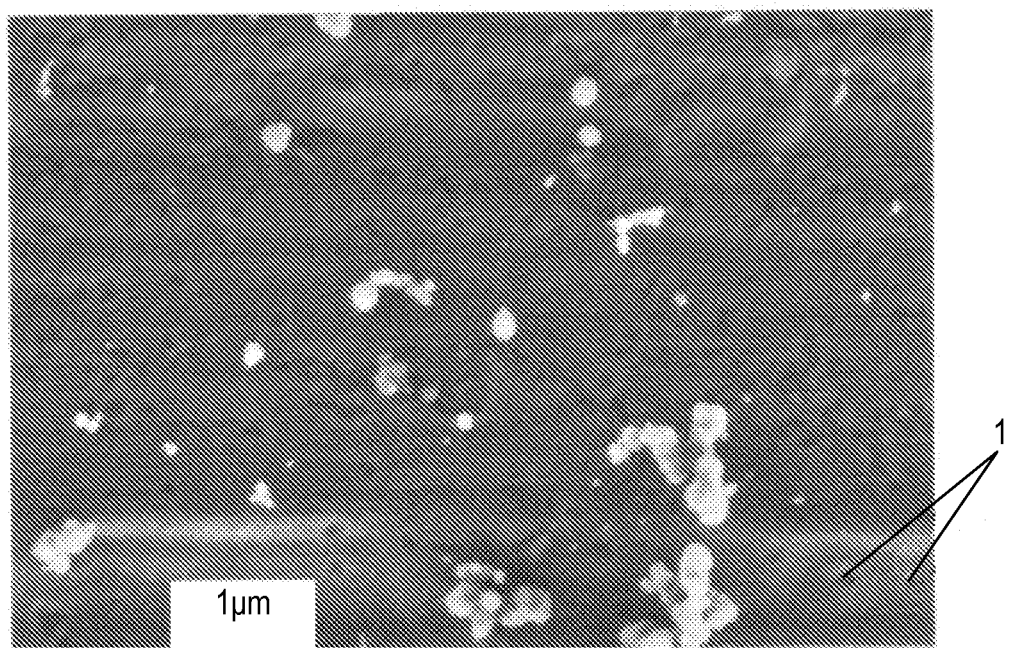
FIG. 8 is a SEM photograph of a surface of the anode terminal of the electrolytic capacitor of a comparative example.

FIG. 8 illustrates evaluation results of electrolytic capacitor 2 according to the embodiment. FIG. 8 shows defect rates caused by a leakage current in Examples 1 and 2 as well as Comparative Examples 1 and 2. This evaluation is based on a criterion that a leakage current not smaller than 0.01 CV is determined as defective. FIG. 8 also shows the ammonium phosphate aqueous solution (PM) and the ammonium adipate aqueous solution (AD) used as the anodizing solution in the re-anodizing in Examples 1 and 2 as well as Comparative Examples 1 and 2.

As shown in FIG. 8, in Examples 1 and 2 in which ammonium adipate salt solution is used as the anodizing solution for the re-anodizing, capacitor element 6 is impregnated with dispersion solution 18 to prevent the particles of the dispersing material from contacting anode terminal 7. Examples 1 and 2 reduce leakage current, about one third, less than Comparative Examples 1 and 2 using ammonium phosphate salt solution, thus reducing the defect rates.

Specifically, Comparative Examples 1 and 2 use phosphoric salt solution as the anodizing solution for the re-anodizing after the anode terminal is connected. This forms a lot of holes 1 in the foil connecting section and the intermediate section of the anode terminal having an oxide film thereon. For example, holes 1 of Comparative Example 1 have opening diameters having a mode value not smaller than 100 nm that is larger than the move value of the particle diameters of the dispersing material. Thus, the dispersing material particles are more easily captured in holes 1. Furthermore, holes 1 reduce the thickness of the oxide film and the particles captured in the holes reduce the withstand voltage.

On the other hand, in Examples 1 and 2, the re-anodizing after anode terminal 7 is connected does not use phosphoric acid aqueous solution as the anodizing solution. This suppresses the chemical change of surface 7A of anode terminal 7 and does not form holes on the surface. For example, in Example 1, holes slightly formed have opening diameters having a mode value smaller than 10 nm that is smaller than the mode value of the particle diameters of the dispersing material. As described above, Examples 1 and 2 can prevent foil connecting section 14 and intermediate section 15 from having large holes in the surfaces thereof. This can prevent the dispersing material particles from being captured and can prevents the withstanding voltage from being lowered.

Anode foil 3 for a capacitor often has a roughened surface having a lot of pores therein. In the case that the roughening is performed by ordinary etching, the diameters of the pores have a mode value ranging from about 100 to 300 nm. Thus, the dispersing material particles having particle diameters having a mode value smaller than 100 nm are effectively used so that the particles can be put in the pores in anode foil 3. The particles of π-conjugated conductive polymer used for the capacitor dispersing material often have a mode value not smaller than 50 nm in order to reduce an ESR. Therefore, the opening diameters of the holes preferably may be preferably smaller than 50 nm that is smaller than the mode value of the diameters of the π-conjugated conductive polymer. For a capacitor application, it is hardly assumed that the π-conjugated conductive polymer having a particle mode value not larger than of 10 nm is used. Thus, the mode value of the π-conjugated conductive polymer may be preferably smaller than 10 nm. The opening diameters of the holes can be measured by mercury intrusion technique. If the holes are too small to be measured by the mercury intrusion technique, plural holes, such as five holes, are measured in diameter by an electronic microscope to calculate the mode value of the opening diameters of the holes.

In Comparative Examples 1 and 2, an oxide film containing phosphorus is formed on the surface of the anode terminal improve wettability to dispersion solution. Thus, in the process of allowing the capacitor element to be impregnated with dispersion solution, the dispersion solution absorbed by the separator moves from the foil connecting section to the base part of the intermediate section to move upward toward the intermediate section and the external connecting section having no oxide film. This may cause the dispersing material particles to contact the anode terminal.

On the other hand, Embodiments 1 and 2 can allow oxide film 12 to contain a small amount of phosphorus and thus can suppress the wettability of the surface of anode terminal 7. In the examples, the contact angle to water is not smaller than 70°, which is larger than the contact angle prior to the re-anodizing. This means that the water repellency of oxide film 12 to dispersion solution 18 increases, and therefore, prevents dispersion solution 18 from moving upward to intermediate section 15 and external connecting section 16 having no oxide film 12 thereon. As a result, the dispersing material particles are prevented from electrically contacting anode terminal 7. The contact angle to water smaller than 70° reduces this effect.

Furthermore, in Examples 1 and 2, oxide film 212 having high water repellency to dispersion solution 18 is formed on side edge surface 3C as a cutting surface of anode foil 3. This structure prevents side edge surface 3C from being impregnated with dispersion solution 18, and hence, prevents solid electrolyte layer 213 from being formed. Specifically, solid electrolyte layer 213 is prevented from being formed on side edge surface 3C at which a current tends to concentrate, thus providing the capacitor element with a high withstanding voltage and a small leakage current. The thickness of solid electrolyte layer 213 provided on side edge surface 3C facing sealing member 10 proportionally increases a height of capacitor element 6. Thus, a stress tends to be caused when case 9 is sealed. In capacitor element 6 according to the embodiment, solid electrolyte layer 213 at side edge surface 3C has a small thickness, thus reducing this stress. This configuration as described above provides Examples 1 and 2 with a smaller leakage current of electrolytic capacitor 2 than Comparative Examples 1 and 2.

Since oxide films 11 and 111 have high hydrophilicity, polymer of solid electrolyte layer 13 can be formed quickly. Since oxide film 12 has high water repellency, polymer can be suppressed from moving up toward anode terminal 7, thus reducing a leakage current and improving productivity.

Oxide films 11 and 111 as an anodized film can maintain water resistance. Oxide films 12 and 212 as re-anodized film can reduce a leakage current. Low wettability and small roughness are achieved by the surface of oxide film 12 formed by the re-anodizing with ammonium adipate-base anodizing solution and boric acid-base anodizing solution other than phosphoric acid-base anodizing solution. This can suppress the upward move or trap of the dispersing material toward anode terminal 7.

Generally, a large roughness is generated when an anode terminal is re-anodized at a high voltage with phosphoric acid-base anodizing solution. Electrolytic capacitor 2 according to the embodiment can suppress such roughness even when being anodized at a high voltage, and effectively reduces a leakage current.

Electrolytic capacitor 2 according to the embodiment has a large capacitance, a small serial equivalent resistance, and a small leakage current. Thus, electrolytic capacitor 2 is useful as an electrolytic capacitor in the field where high reliability is required. For example, electrolytic capacitor 2 is useful as an in-vehicle electrolytic capacitor that has a high withstanding voltage and that is suppressed from having short circuiting. Furthermore, electrolytic capacitor 2 reduces a leakage current and can suppress battery consumption. Thus, the electrolytic capacitor according to the embodiment is also useful for an in-vehicle electrolytic capacitor directly connected to, e.g. a battery.

INDUSTRIAL APPLICABILITY

An electrolytic capacitor according to the exemplary embodiment has a large capacitance, a low serial equivalent resistance, and a small leakage current. Thus, the electrolytic capacitor according to the embodiment is useful as an electrolytic capacitor in the field where high reliability is required.

REFERENCE MARKS IN THE DRAWINGS

2 Electrolytic Capacitor
3 Anode Foil
3A Surface of Anode Foil
3B Back Surface of Anode Foil
3C Side Edge Surface of Anode Foil
4 Cathode Foil
5 Separator
6 Capacitor Element
7 Anode Terminal
7A Surface of Anode Terminal
11 Oxide Film (First Oxide Film)
12 Oxide Film (Second Oxide Film)
13 Solid Electrolyte Layer
17 Valve Metal Foil
212 Oxide Film (Third Oxide Film)

The invention claimed is:

1. An electrolytic capacitor comprising:
   a capacitor element including:
      an anode foil having a surface,
      a first oxide film provided on the surface of the anode foil;
      a solid electrolyte layer made of solid electrolyte provided on the first oxide film, the solid electrolyte layer being formed using π-conjugated conductive polymer dispersing material containing water and particles of conductive polymer, and
      a cathode foil provided on the solid electrolyte layer, the cathode foil facing the first oxide film across the solid electrolyte layer;
   an anode terminal connected to the anode foil; and
   a second oxide film provided on a surface of the anode terminal,
   wherein the second oxide film provided on the anode terminal has higher water repellency than the first oxide film provided on the anode foil.

2. The electrolytic capacitor according to claim 1, wherein the anode terminal having the second oxide film thereon contains a smaller amount of phosphorus than the anode foil having the first oxide film thereon.

3. The electrolytic capacitor according to claim 1, wherein a contact angle between the second oxide film and water is not smaller than 70°.

4. The electrolytic capacitor according to claim 1,
   wherein the anode foil further has a back surface opposite to the surface, and a side edge surface connected to the surface and the back surface,
   wherein the electrolytic capacitor further includes a third oxide film provided on the side edge surface of the anode foil, and
   wherein the third oxide film has higher water repellency than the first oxide film.

5. The electrolytic capacitor according to claim 1, further comprising a separator provided between the anode foil and the cathode foil, the separator retaining the solid electrolyte.

6. The electrolytic capacitor according to claim 1, wherein the solid electrolyte layer includes a first portion provided on the first oxide film and a second portion which is provided on the second oxide film and thinner than the first portion.

7. The electrolytic capacitor according to claim 1,
   wherein the anode foil has a surface having pores provided therein,
   wherein the anode terminal has a surface having holes provided therein,
   wherein a mode value of diameters of the pores of the anode foil is larger than a mode value of diameters of the particles of the conductive polymer, and
   wherein a mode value of opening diameters of the holes of the anode terminal is smaller than the mode value of the diameters of the particles of the conductive polymer.

8. The electrolytic capacitor according to claim 1,
   wherein the first oxide film contains 6 ppm or more phosphorus, and
   wherein phosphorus is contained in the second oxide film at a concentration lower than about 1 ppm.

9. A method of manufacturing an electrolytic capacitor, comprising:
   providing an anode foil made of valve metal and a first oxide film provided on a surface of the anode foil which contains phosphorus;
   connecting an anode terminal to the anode foil;
   forming a capacitor element by stacking the anode foil, a cathode foil, and a separator such that the separator is provided between the anode foil and the cathode foil;
   forming a second oxide film on the surface of the anode terminal by anodizing the anode terminal with at least one of electrolysis solution containing adipate or borate as electrolyte and electrolysis solution consisting of boric acid aqueous solution;
   providing π-conjugated conductive polymer dispersing solution containing water and particles of conductive polymer; and
   after said providing the π-conjugated conductive polymer dispersing solution, impregnating the capacitor element with the π-conjugated conductive polymer dispersing solution.

10. The method according to claim 9, wherein said forming the second oxide film on the surface of the anode terminal is executed after said connecting the anode foil to the anode terminal and before said forming the capacitor element.

11. The method according to claim 9,
   wherein the anode foil further has a back surface opposite to the surface and a side edge surface connected to the surface and the back surface,
   said method further comprising forming a third oxide film on the side edge surface of the anode foil using adipate solution.

12. The method according to claim 11, wherein said forming the second oxide film on the surface of the anode terminal is executed simultaneously to said forming the third oxide film on the side edge surface of the anode foil.

13. The method according to claim 12,
wherein said forming the first oxide film comprises:
anodizing a valve metal foil made of the valve metal with the electrolysis solution; and
then, cutting the valve metal foil, and
wherein the side edge surface of the anode foil has a surface obtained by cutting the valve metal foil in said cutting the valve metal foil.

14. The method according to claim 9, wherein said providing the anode foil and the first oxide film comprises forming the first oxide film on a surface of the anode foil by anodizing the anode foil with electrolysis solution including phosphoric salt as electrolyte.

15. The method according to claim 9, wherein said impregnating the capacitor element with the π-conjugated conductive polymer dispersing solution comprises forming a first solid electrolyte layer provided on the first oxide film and a second solid electrolyte layer which is provided on the second oxide film and is thinner than the first solid electrolyte layer by impregnating the capacitor element with the π-conjugated conductive polymer dispersing solution.

16. An electrolytic capacitor comprising:
a capacitor element including:
an anode foil having a surface,
a first oxide film provided on the surface of the anode foil;
a solid electrolyte layer made of solid electrolyte provided on the first oxide film, the solid electrolyte layer being formed using π-conjugated conductive polymer dispersing material containing water and particles of conductive polymer, and
a cathode foil provided on the solid electrolyte layer, the cathode foil facing the first oxide film across the solid electrolyte layer;
an anode terminal connected to the anode foil; and
a second oxide film provided on a surface of the anode terminal,
wherein the first oxide film contains 6 ppm or more phosphorus, and
wherein phosphorus is contained in the second oxide film at a concentration lower than about 1 ppm.

17. The electrolytic capacitor according to claim 16, wherein the solid electrolyte layer includes a first portion provided on the first oxide film and a second portion which is provided on the second oxide film and thinner than the first portion.

18. The electrolytic capacitor according to claim 16,
wherein the anode foil has a surface having pores provided therein,
wherein the anode terminal has a surface having holes provided therein,
wherein a mode value of diameters of the pores of the anode foil is larger than a mode value of diameters of the particles of the conductive polymer, and
wherein a mode value of opening diameters of the holes of the anode terminal is smaller than the mode value of the diameters of the particles of the conductive polymer.

19. An electrolytic capacitor comprising:
a capacitor element including:
an anode foil having a surface,
a first oxide film provided on the surface of the anode foil;
a solid electrolyte layer made of solid electrolyte provided on the first oxide film, the solid electrolyte layer being formed using t-conjugated conductive polymer dispersing material containing water and particles of conductive polymer, and
a cathode foil provided on the solid electrolyte layer, the cathode foil facing the first oxide film across the solid electrolyte layer;
an anode terminal connected to the anode foil; and
a second oxide film provided on a surface of the anode terminal,
wherein the anode foil has a surface having pores provided therein,
wherein the anode terminal has a surface having holes provided therein,
wherein a mode value of diameters of the pores of the anode foil is larger than a mode value of diameters of the particles of the conductive polymer, and
wherein a mode value of opening diameters of the holes of the anode terminal is smaller than the mode value of the diameters of the particles of the conductive polymer.

20. The electrolytic capacitor according to claim 19, wherein the solid electrolyte layer includes a first portion provided on the first oxide film and a second portion which is provided on the second oxide film and thinner than the first portion.

21. The electrolytic capacitor according to claim 19,
wherein the first oxide film contains 6 ppm or more phosphorus, and
wherein phosphorus is contained in the second oxide film at a concentration lower than about 1 ppm.

* * * * *